United States Patent [19]

Barrett

[11] 3,845,643
[45] Nov. 5, 1974

[54] WHEEL LOCKING DEVICE
[76] Inventor: Robert M. Barrett, 4439 W. 34th St., Indianapolis, Ind. 46222
[22] Filed: Nov. 9, 1973
[21] Appl. No.: 414,285

[52] U.S. Cl............................ 70/18, 70/226, 188/32
[51] Int. Cl........................... E05b 73/00, B60t 3/00
[58] Field of Search ....... 70/18, 225, 226, 229, 232, 70/DIG. 57; 188/29, 32; 280/150 R; 248/119

[56] References Cited
UNITED STATES PATENTS

| | | | |
|---|---|---|---|
| 418,829 | 1/1890 | Towle .............................. | 70/226 X |
| 3,537,548 | 11/1970 | Jeppesen.......................... | 70/225 X |
| 3,687,238 | 8/1972 | Carpenter........................ | 188/32 |
| 3,713,668 | 1/1973 | Flindt............................... | 70/226 X |

FOREIGN PATENTS OR APPLICATIONS
590,544   1/1934   Germany .............................. 70/226

Primary Examiner—Robert L. Wolfe
Attorney, Agent, or Firm—Woodard, Weikart, Emhardt & Naughton

[57] ABSTRACT

Disclosed is a tray-shaped device having a flap member hinged to its outer side margin. The tray is adapted to accommodate a wheel of a vehicle which is to be immobilized. A chain is fastened to the inboard margin of the tray intermediate its ends and the two free sections of the chain are wrapped about the vehicle axle adjacent the wheel, then brought to the front of the wheel and threaded through eyelets on the front face of the hinged flap which is positioned generally vertically adjacent the wheel. A conventional padlock joins the ends of the chain over the flap.

5 Claims, 5 Drawing Figures

WHEEL LOCKING DEVICE

BACKGROUND OF THE INVENTION

The increased use of boat trailers, camper trailers and the like and the corresponding increased thefts of such vehicles while parked has brought need for a simple, relatively inexpensive, but foolproof means for immobilizing such wheeled vehicles.

The wheel locking device of the present invention fulfills these requirements. The device is conveniently installed by rolling one of the vehicle wheels into the flat, wheel-accommodating tray. The hinged flap which, when in place, overlies and masks the vehicle wheel lug bolts, can be moved within limits laterally with respect to the tray component so that the vehicle wheel need not be precisely centered on the tray as the vehicle is backed or rolled into position. The wheel locking device, when in place, in effect secures together the tray component of the device, the vehicle wheel and the axle (one of the strongest structural components of a vehicle of the type referred to) and the strength inherent in this involvement of the vehicle axle is an important feature of the locking device of the present invention. The device, when in place, cannot be removed by jacking the involved wheel and, because the chain is linked at relatively short radius to the wheel-overlying flap, the device cannot be removed by manipulating or prying the chain out of place, even when the tire on the involved wheel has been deflated. Because the wheel lug nuts are masked by the flap, the device cannot be defeated by removal of the vehicle wheel.

DESCRIPTION OF THE PREFERRED EMBODIMENT

Figure 1:
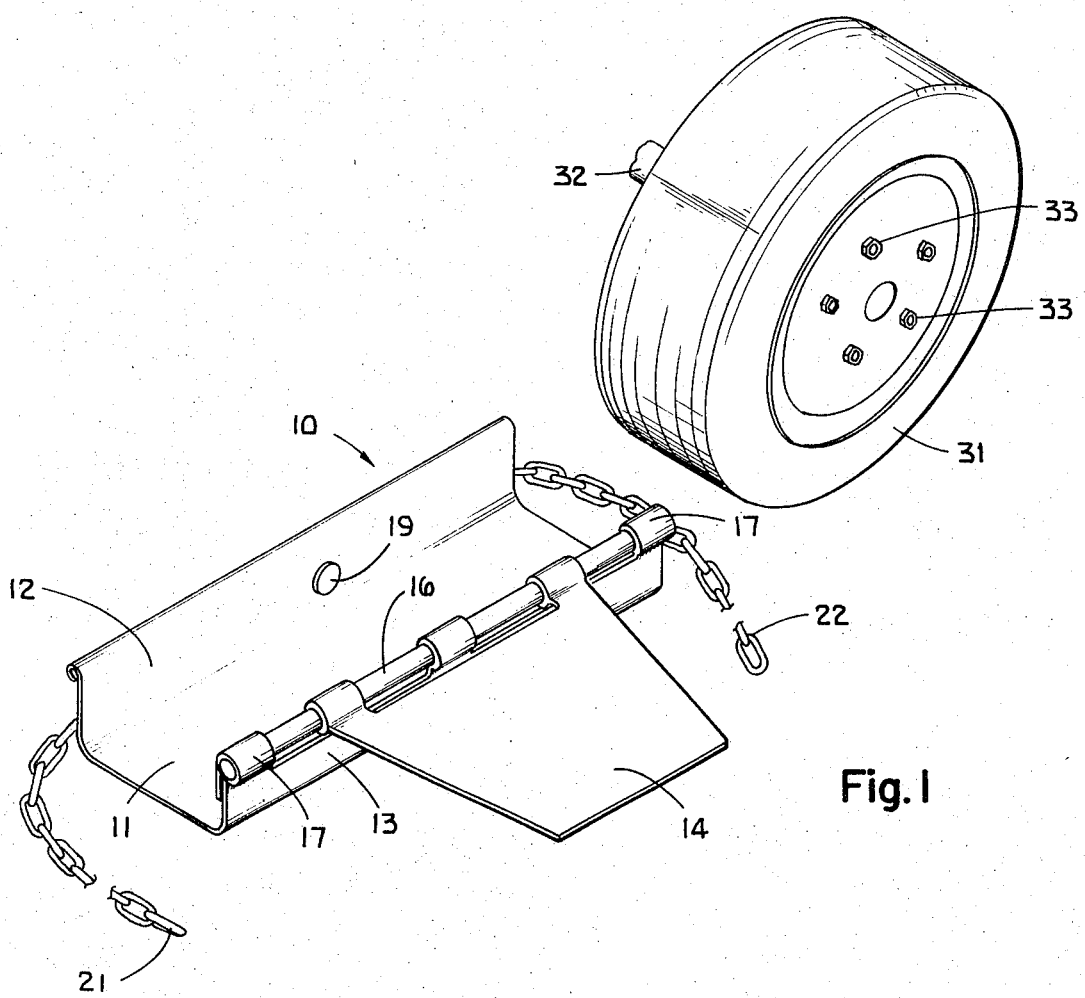
FIG. 1 is a perspective view of the apparatus about to receive the wheel of a vehicle.
Figure 4:
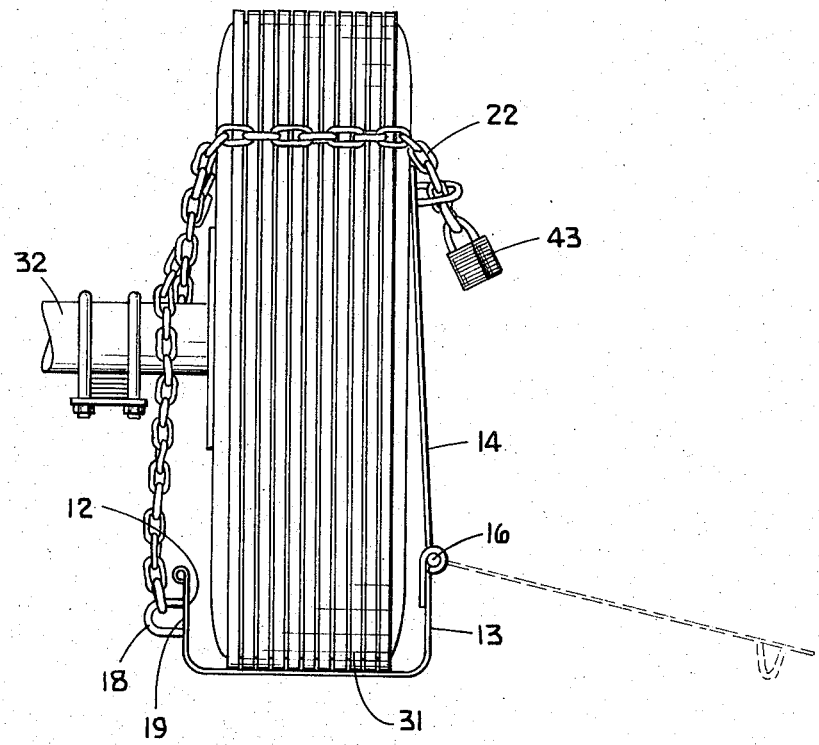
FIG. 4 is an end view of the structure shown in FIG. 3, the shielding flap being shown in broken lines in its open position.

Referring initially to FIG. 1, the apparatus includes a generally rectangular, drive-on tray member 10 having a base 11 and an upwardly flanged inner side margin 12 and an upwardly flanged outer side margin 13. A shielding flap 14 is hinged to the flanged margin 13. The flap 14 is pivotally accommodated on a shaft 16 forming a hinge pintle, the shaft being supported intermediately and at its ends by bearings 17 carried by the upwardly extending flange 13. As shown in FIG. 1, the flap 14 extends outwardly and sidewardly but can be moved to a generally upright or vertical position as will subsequently be described. An elongated flexible member, preferably taking the form of a relatively heavy chain is secured intermediate its ends to the inner flange 12 of the tray. The method of rigidly securing the chain to the flange can take any suitable form such as providing a member 18 (Fig. 4) which is welded at 19 to the flange. The free section 21 and 22 of the chain are of sufficient length to extend across the tray to the front or outer side of the apparatus as will be evident from FIG. 1, The point of attachment 19 of the chain to the flange 12 is preferably at the midpoint of the length of the tray 10.

Figure 3:
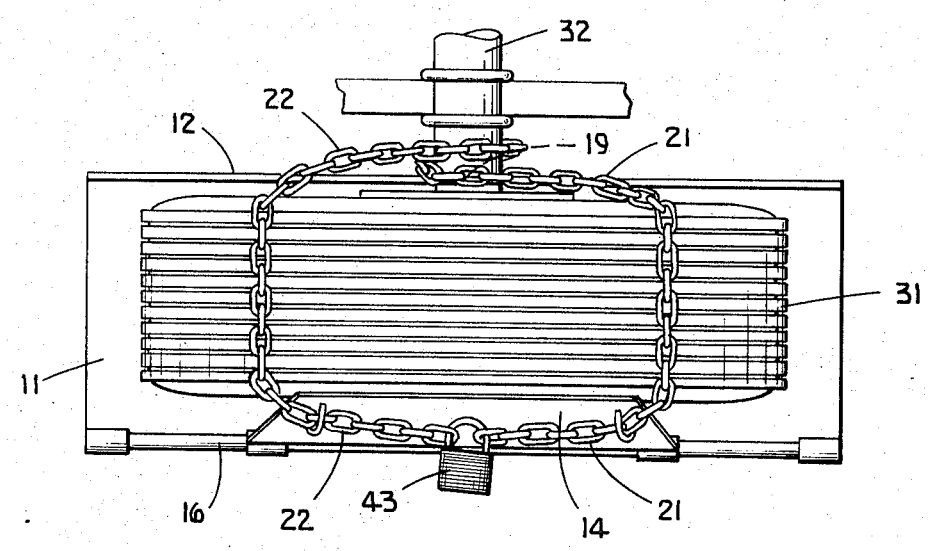
FIG. 3 is a top plan view of the structure shown in FIG. 2.
Figure 2:
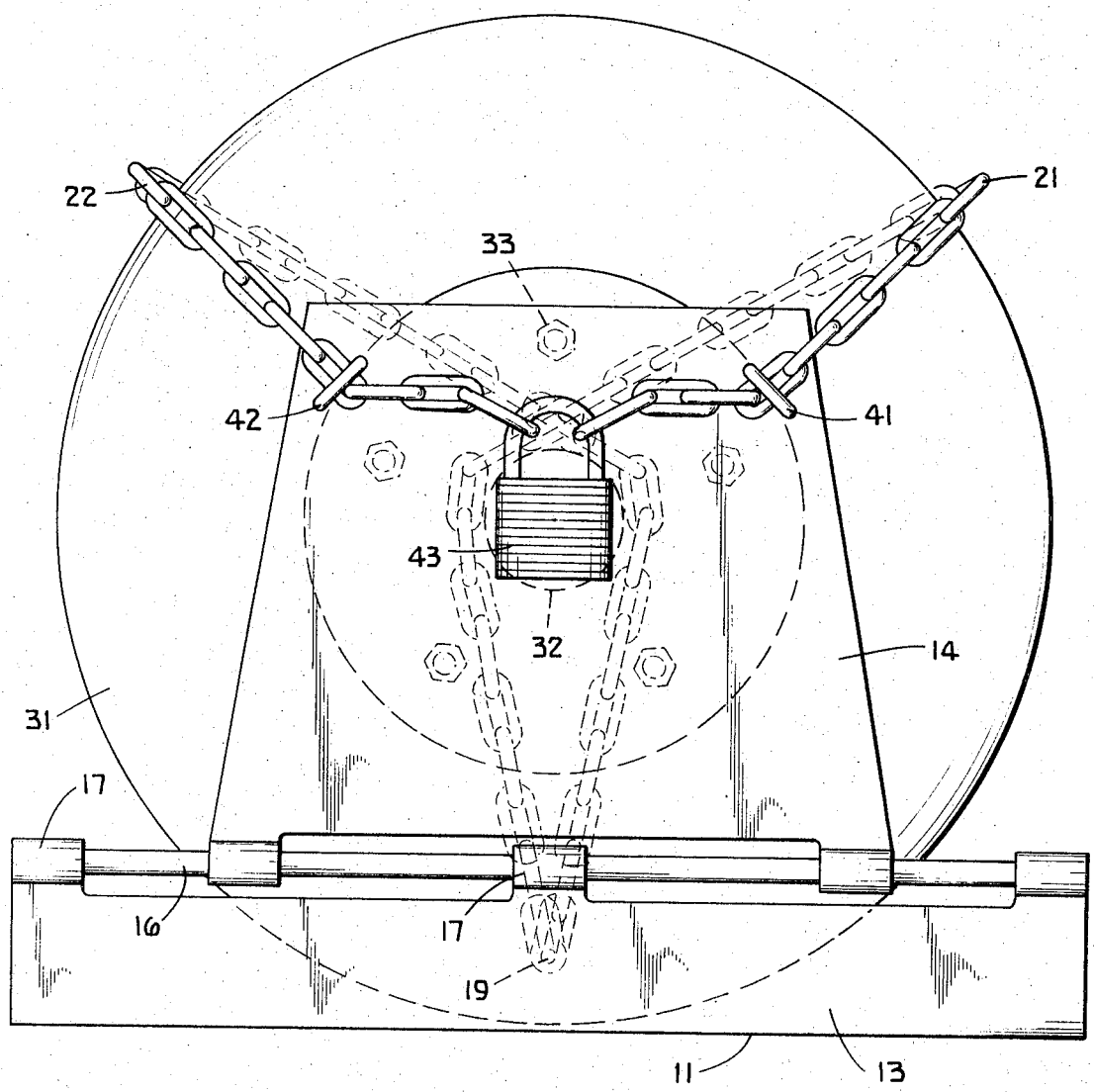
FIG. 2 is a side view of the apparatus of the present invention showing the apparatus locked in place on the vehicle wheel.

In operation, with the flap 14 in its outward or open position as shown in FIG. 1, one wheel 31 of an axle supported wheeled vehicle (the vehicle axle being shown fragmentarily at 32 in FIGS. 1, 3 and 4) is positioned adjacent the end of the tray member 11 as shown in FIG. 1. The vehicle may then be backed or rolled into position such that the wheel is substantially centered in the tray as indicated in FIG. 2. The flap 14 may then the moved to its upright position and in this position, as shown in FIG. 1, the flap will mask the lug bolts 33 which conventionally attach the wheel to the axle 32. It will be noted that the pintle shaft 16 is free over a substantial portion of its length so that the shaft encircling portions of the flap 14 can shift along the pintle permitting the flap 14 to be shifted laterally, within limits, to accommodate a wheel which has not been precisely centered on the tray. Thus, even though the vehicle wheel is not precisely centered on the tray the flap 14 may be positioned so as to mask the wheel lug bolts. As will be evident from FIG. 2, the front face of the tray 14 carries eyelets 41 and 42 which extend outwardly from the face of the flap. The clain section 21 extends through the eyelet 41 and the chain section 22 extends through the eyelet 42, the plane of the opening through which the chain sections extend being inclined, preferably at an angle of approximately 45° with the horizontal. In installing the chain about the wheel 31 the chain sections are brought upwardly and over the vehicle axle 32 and are then brought across the periphery of the wheel and through the respective eyelets 41 and 42. The two chain sections are then pulled tight and joined by a locking member which, as herein disclosed, takes the form of a conventional padlock 43.

As will be evident from FIG. 2, the placement and angle of inclination of the eyelets 41 and 42 is such that the portion of the chain passing over the tread area of the wheel periphery is relatively close to the eyelets so that a prying tool (crowbar or the like) inserted under the chain at the tread area or wheel periphery can only swing this portion of the chain on a relatively short radius and prevents shifting of this area of the chain to any appreciable extent. The flap 14 prevents access to the conventional wheel hubcap which covers the lug bolts 33, and jacking of the axle does not aid in removing the tray 10 from the wheel. The locking member 43 joins the chain section ends and, because the chain is pulled tight through the eyelets 41 and 42, the locking member tightly joins the chain to the flap at the front face of the flap 14. The tray component is anchored to the wheel and axle, by means of the chain at three fixed points 19, 41 and 42. The inclination, preferably 45° with the horizontal, of the eyelets 41 and 42 prevent any appreciable sideward movement of the flap with relation to the wheel. The tray component 11 is preferably formed with a length somewhat longer than the diameter of the wheel with which it is to be used, this preventing any tipping or longitudinal tilting of the tray during attempts to move the vehicle on which the wheel is mounted. The relatively large surface area of the tray component 11 which engages the underlying support surface also tends to increase the force necessary to drag the tray over a supporting surface as would occur should an attempt be made to move the vehicle without rotating the wheel on which the apparatus of the present invention is mounted. The apparatus is relatively light in weight and requires no complicated assembly instructions and can be conveniently stored when not in use.

Figure 5:
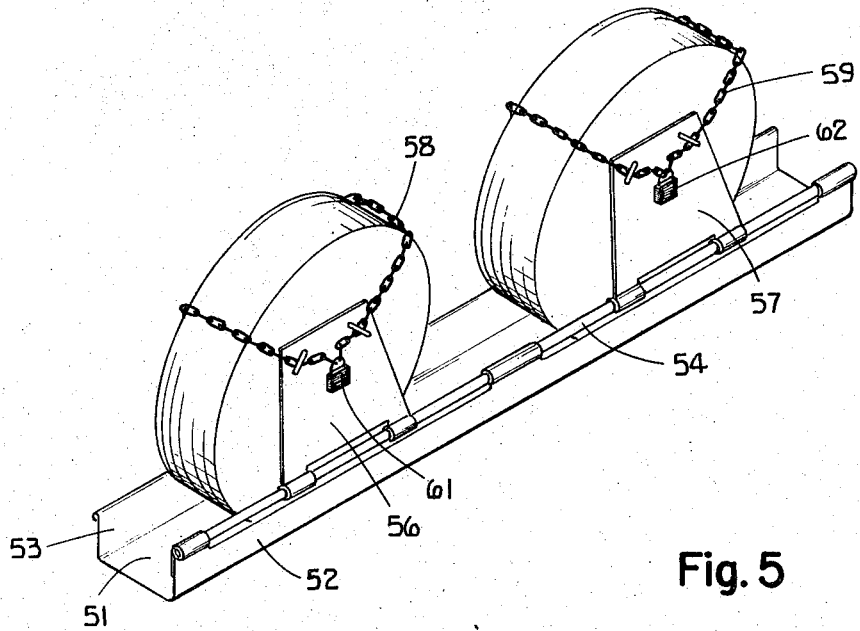
FIG. 5 is a perspective view of a modified form of the apparatus adapted to accommodate multiple vehicle wheels.

Referring to FIG. 5 a modified form of the apparatus described above is illustrated, the structure of FIG. 5 carrying a plurality of flap components and, thus, being adaptable for use with vehicles such as trailers of the type having two or more wheels in line each supported on a separate axle. This modified structure includes a tray base 51 having an upwardly extending outer flange 52 and an upwardly extending inner flange 53. The upper margin of the outer flange carries the pintle rod 54 on which are pivotally mounted the flap components 56 and 57. When the apparatus is in place, the flaps are locked in upright position by means of chains 58 and 59 which are secured at their midpoint to the rear flange 53, each chain being drawn tight by means of locking members 61 and 62. Installation of this modified form of the apparatus is the same as that described above with reference to FIGS. 1–4. I claim:

1. An apparatus for immobilizing an axle-supported wheeled vehicle, said apparatus comprising a drive-on tray having upwardly flanged side margins and adapted to underlie a vehicle wheel received between said margins, a shielding flap hinged to the outer flanged margin of the tray and adapted to be moved to extend outwardly and sidewardly while a vehicle wheel is entering said tray and to pivot upwardly to a generally vertical position when the vehicle wheel is in place on the tray thereby masking the wheel lug bolts or the like attaching the wheel to the vehicle, an elongated flexible member wrapped about the vehicle axle, and a releasable locking member tightly joining said flexible member to said shielding flap when the flap is in its said generally vertical position.

2. An apparatus as claimed in claim 1 in which the hinged connection between flap and said outer flanged margin permits limited lateral shifting of said flap with relation to the flange to accommodate a vehicle wheel which is not centered in the tray.

3. An apparatus as claimed in claim 1 in which said elongated flexible member is attached intermediate its ends to the inner flanged margin of said tray, both free segments of said flexible member being wrapped about the vehicle axle and extending across the periphery of the wheel to the front face of said flap, spaced eyelet members on the front face of the flap through which said segments extend, said locking member joining said flexible member segments.

4. An apparatus as claimed in claim 3 in which the point of attachment of the flexible member to said inner flanged margin of the tray is centered along the length of the flange and said spaced eyelet members are two in number disposed on said flap above the rotational axis of the wheel.

5. An apparatus as claimed in claim 4 in which the apertures in the eyelet members through which said flexible member extends lie in an inclined plane.

* * * * *